United States Patent
Aschenbach

(10) Patent No.: US 6,832,570 B2
(45) Date of Patent: Dec. 21, 2004

(54) FENDER WITH COMPACT SPRING ELEMENT

(76) Inventor: Karl L. Aschenbach, 2926 S. Steele St., Tacoma, WA (US) 98409

(*) Notice: Subject to any disclaimer, the term of this patent is extended or adjusted under 35 U.S.C. 154(b) by 0 days.

(21) Appl. No.: 10/205,861

(22) Filed: Jul. 26, 2002

(65) Prior Publication Data

US 2004/0016382 A1 Jan. 29, 2004

(51) Int. Cl.$^7$ .............................................. B63B 59/02
(52) U.S. Cl. ....................................... 114/219; 405/215
(58) Field of Search ........................... 114/219; 405/212, 405/215

(56) References Cited

U.S. PATENT DOCUMENTS

| | | | |
|---|---|---|---|
| 2,263,063 A | 11/1941 | Allen ........................... | 45/137 |
| 2,910,033 A | * 10/1959 | Weisburg ..................... | 114/219 |
| 2,959,146 A | * 11/1960 | Erkert .......................... | 114/219 |
| 3,372,552 A | 3/1968 | Liddell | |
| 4,084,533 A | * 4/1978 | Boyer .......................... | 114/219 |
| 4,307,876 A | 12/1981 | Cleaves ....................... | 267/139 |
| 4,308,704 A | 1/1982 | Lloyd ........................... | 52/716 |
| 4,854,258 A | * 8/1989 | Hausmann et al. ......... | 114/219 |
| 5,286,576 A | 2/1994 | Srail et al. | |
| 5,429,063 A | 7/1995 | Rosenkranz | |
| 5,743,204 A | * 4/1998 | Tweet .......................... | 114/219 |
| 5,830,396 A | * 11/1998 | Higgins et al. ............. | 264/109 |
| 5,836,134 A | 11/1998 | Couto et al. ............. | 52/718.02 |
| 6,050,211 A | 4/2000 | Yamaguchi .................. | 114/219 |
| 6,187,420 B1 | 2/2001 | Tajima et al. ................ | 428/213 |
| 6,604,888 B2 | 8/2003 | Dolan | |
| 2002/0110423 A1 | 8/2002 | Miller et al. | |
| 2004/0018383 A1 | 1/2004 | Aschenbach | |

OTHER PUBLICATIONS

Ultra High Molecular Polyethylene—The Material and Its Modifications (Translated from Kunststpffe 69 (1979) 8, pp. 434/439) by Dr. Gunther Braun.

Ultra High Molecular Weight Polyethylene (UHMWPE), by Harvey L. Stein, Ticona LLC, from Engineered Materials Handbook, vol. 2, ASMInternational, 1999.

Analysis of Contemporary Resins and Conversion Methods, ASTM Working Group for Medical Grade UHMWPE, by Stven Kurth, Ph.D, Oct. 15, 2001.

* cited by examiner

Primary Examiner—Sherman Basinger
(74) Attorney, Agent, or Firm—Stoel Rives LLP

(57) ABSTRACT

A unitary fender having a compact spring shape for protecting an object, such as a dock or boat, includes a mounting portion and a resilient leaf spring portion integrally formed of one-piece construction with the mounting portion. The leaf spring portion is designed to collapse and absorb a substantial amount of energy upon impact with another object while a free end of the leaf spring slides along a front side of the mounting portion. In a preferred embodiment, the fender is extruded of a high-strength abrasion-resistant plastic material having a low coefficient of friction, such as ultra high molecular weight polyethylene (UHMWPE). The leaf spring portion may include multiple access holes sized admit a tool for installing or removing the fender.

19 Claims, 3 Drawing Sheets

FENDER WITH COMPACT SPRING ELEMENT

TECHNICAL FIELD

The present invention relates to fenders for protecting an object from being damaged by impact or rubbing against another object and, in particular, to an improved fender including an integral leaf spring element that is particularly useful for protecting boat hulls and docks.

BACKGROUND OF THE INVENTION

Fenders (also known as rub rails, rub guards, and bumpers) are commonly used to facilitate sliding and prevent damage to a boat or other vessel when rubbing or bumping against structures, such as pilings and docks. Fenders are typically attached along the hull of a boat, but may also be attached to docks, pilings, seawalls, bridge footings, and other structures against which a vessel may rub or bump. Fenders are also useful to protect other objects from damage due to rubbing and bumping—especially land vehicles, such as truck trailers, and warehouse loading docks.

A fender system used with many military and commercial ships includes a length of half round steel pipe (hereinafter "split pipe") extending along the hull and welded to the outside of hull to form a raised rib. A relatively smooth outer surface of the fender is desirable for sliding maneuvers such as docking, when the vessel is sliding along another object, such as a piling or dock. In these sliding maneuvers, any dents or discontinuities in the outer surface of the split pipe fender can inhibit a smooth sliding action by converting the desired longitudinal motion into an undesirable athwart ship motion, thereby causing the vessel to move away from the piling surface along which sliding is intended to occur. Dents in the split pipe can also cause impact loads to be concentrated at a small location on the hull, rather than dispersing loads across a relatively large area. The strength of the split pipe determines the energy absorption capability of the fender system in impact situations. When impacts occur that exceed its strength, the steel permanently deforms, leaving a dented outer surface. Such dents must be repaired to maintain a smooth sliding surface. Furthermore, the outer surface of the split pipe is typically painted and requires regular repainting and maintenance to prevent corrosion and other causes of failure, even in the absence of severe impacts.

Pleasure boats commonly have a light-duty fender system that includes strips of elastomer material seated in retainer channels or brackets along the sides of the hull. One such light-duty fender system is described in U.S. Pat. No. 2,959,146 of Erkert. Such fender systems are able to maintain a smooth sliding surface without discontinuities because the elastomer material is resilient. However, elastomer materials have a higher coefficient of friction than painted steel. Consequently, elastomer fenders do not slide as easily as split pipe fenders. Friction effects become even more pronounced when the elastomer is compressed, as during high impact conditions. The elastomer material also has limited abrasion resistance. In certain situations, the elastomer can be pulled out of its retainer, thereby making the fender system ineffective. Such fender systems also have a lower impact absorption capability than split pipe fender systems, and can allow impact forces to be transferred to the hull and cause damage.

U.S. Pat. No. 4,084,533 of Boyer describes a reversible rubrail for boats and ships that is formed of a unitary strip of extruded rubber or flexible plastic material. The rubrail includes a rear wall for connection to a boat and a pair of front walls extending from top and bottom edges of the rear wall in an arcuate shape to overlap along free ends of the front walls. The front walls are flexible and can be folded back to allow screws, bolts, or staples to be inserted through the rear wall for installation of the rubrail. Because the material of the front walls must be soft enough to be manually folded back for installation, the rubrail of Boyer would also suffer from the high coefficient of friction and low abrasion resistance of conventional elastomer strip fender systems.

A need exists for a fender that can absorb a substantial amount of energy, that is highly resistant to permanent deformation and abrasion, has a low coefficient of friction, is easily installed, and requires little or no maintenance.

SUMMARY OF THE INVENTION

In accordance with the present invention, a fender for protecting a vehicle or object from damage includes a mounting portion and a resilient leaf spring portion integrally formed of one-piece construction with the mounting portion. In a preferred embodiment, the fender is extruded of a high-strength abrasion-resistant plastic material having a low coefficient of friction and a high impact resistance, such as an ultra high molecular weight polyethylene, to form a compact spring having a "P"-shaped cross section.

The mounting portion of the fender includes a rear side for mounting to the object or vehicle, and a front side opposite the rear side. The mounting portion preferably includes multiple mounting holes, which may be drilled after extrusion and which are sized to receive screws or bolts for attaching the fender to an object or vessel.

The resilient leaf spring portion projects outwardly from a common joint region along the front side of the mounting portion to span over at least part of the front side. The distal end of the leaf spring portion is free to slide along the front side of the mounting portion when the leaf spring portion flexes under load. The leaf spring portion may include multiple access holes in alignment with the mounting holes of the mounting portion. The access holes admit a tool, such as a socket wrench or screwdriver, for tightening fasteners used to attach the fender to an object or vessel via the mounting holes.

Preferably the mounting portion of the fender is backed by a layer of elastomeric material interposed between the rear side of the mounting portion and the object or vessel, to provide further dampening and load distribution. Pigments or additives may be added to the plastic material to improve the fender's appearance and/or resistance to ultraviolet radiation. In one embodiment, the fender is provided with a flat upper surface on an outer portion of the common joint region that can be aligned with the upper edges of a boat deck or dock to increase the usable area of the deck or dock. A high-friction traction material may be embedded in the flat upper surface to enhance safety by reducing slippage at the edges of the deck or dock.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 1:
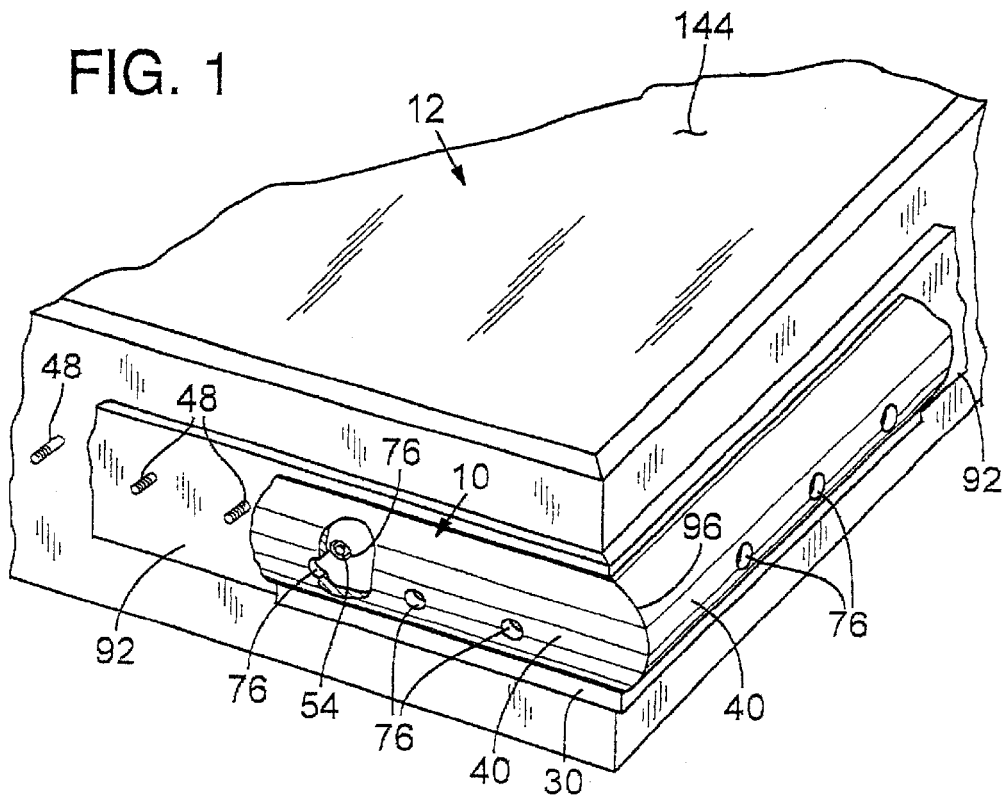
FIG. 1 is a perspective view a corner of a dock to which is mounted a fender in accordance with a first embodiment.
Figure 2:
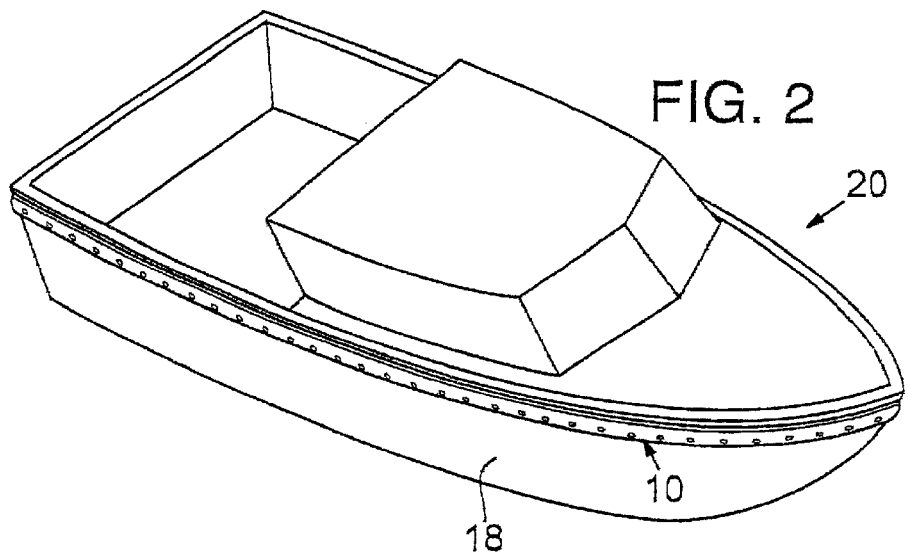
FIG. 2 is a perspective view of a fender in accordance with the invention mounted to the hull of a boat.

FIG. 1 is a partial fragmentary view of a fender 10 in accordance with a first preferred embodiment of the present invention shown mounted to a dock 12. FIG. 2 shows fender 10 mounted to a hull 18 of a boat 20. Although FIGS. 1 and 2 show use of the present invention in a marine setting, those skilled in the art will understand that the fender of the present invention has utility in any environment or application where there is a need to protect an object from damage due to collisions with another object, regardless of whether one of the objects is stationary. For example, fenders in accordance with the present invention are also useful for delivery trucks and vans, warehouse loading docks, automobiles, pushcarts, walls, seawalls, bridge footings, locks, and any other objects and environments in which collisions are common and in which, if not protected, the objects are subject to damage during collisions. For convenience, and without limiting the scope of the invention, the following description of preferred embodiments proceeds with reference to use of the invention in a marine environment and, specifically, in connection with a boat or dock, as shown in FIGS. 1 and 2.

Figure 3:
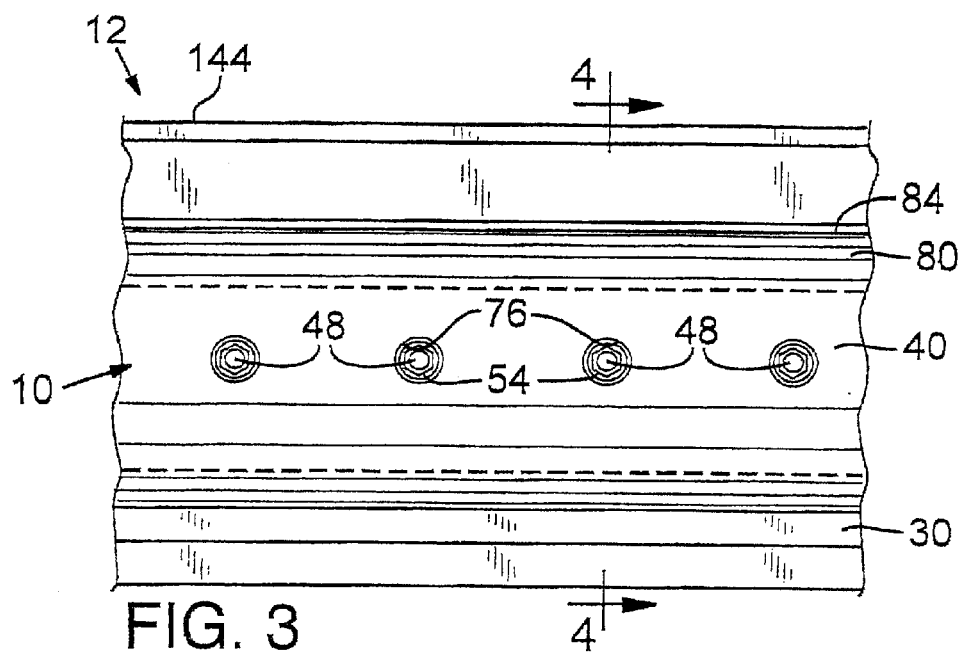
FIG. 3 is a front elevation view of the fender of FIG. 1.
Figure 4:
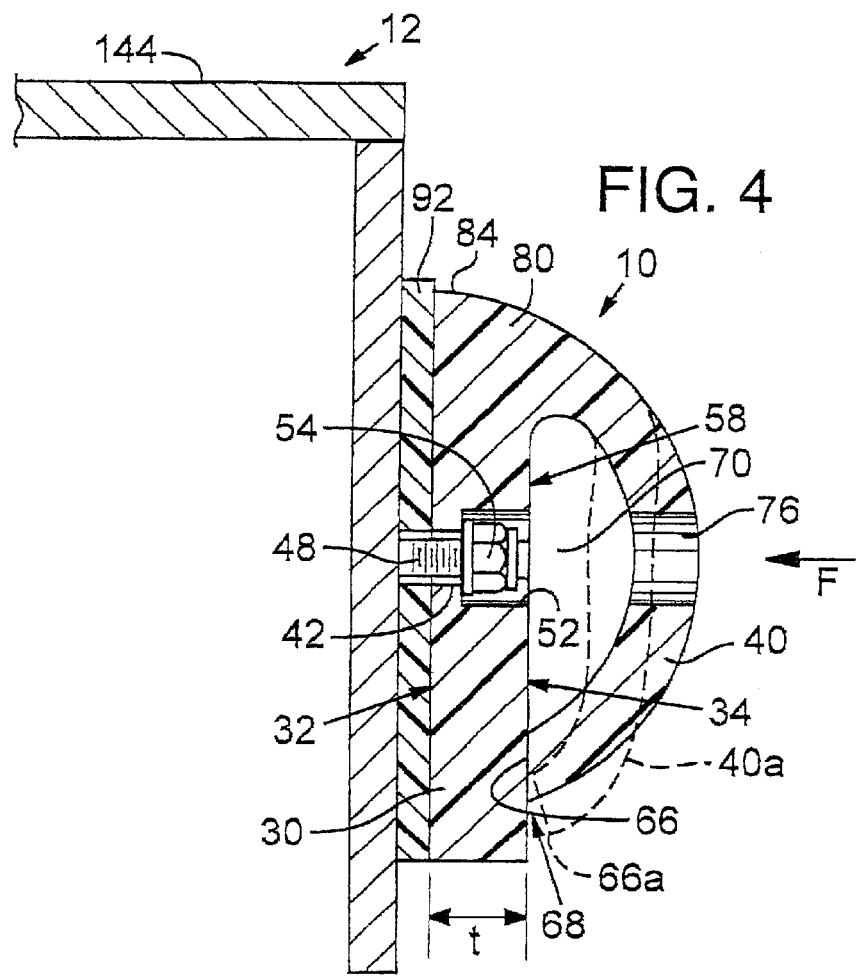
FIG. 4 is an enlarged cross section view of the fender of FIG. 1, taken along line 4—4 of FIG. 3.

FIG. 3 is a front elevation view of fender 10 mounted to dock 12. FIG. 4 is an enlarged cross section view of fender 10 taken along line 4—4 of FIG. 3. With reference to FIGS. 3 and 4, fender 10 includes a mounting portion 30 and a leaf spring portion 40 integrally formed of a unitary, one-piece construction. Mounting portion 30 is preferably an elongate planar strip having a rear side 32 that faces toward dock 12 and a front side 34 opposite rear side 32 and facing away from dock 12. Fender 10 may be flexible enough along its length to conform to a slightly curved shape such as hull 18 (FIG. 2) when mounted thereto. Alternatively, fender 10 and/or mounting portion 30 may be shaped to conform to an irregularly-shaped object (not shown), for example by heating and bending, molding, or other fabrication or machining methods known in the art. Fender 10 may also be made in shapes that are not elongate strips, such as round shapes, for example (not shown).

Mounting portion 30 includes multiple mounting holes 42 extending through its thickness "t" and spaced apart along the length of fender 10. Mounting holes 42 are sized to receive a mounting fastener 48, such as a bolt or screw. Each of the mounting holes 42 preferably includes a countersink or a counterbore 52 that is deep enough so that a head or nut 54 of mounting fastener 48 does not protrude above an outer surface 58 of front side 34, thereby preventing damage to mounting fasteners 48. The thickness t of mounting portion 30 will typically be dictated by the size of the bolt head or nut 54 and the thickness of material of the mounting portion 30 required to securely fasten fender 10 to dock 12 (i.e., material clamped between the head or nut 54 and dock 12). However, other considerations such as flexibility, expected loads, durability, and aesthetics may also be considered when determining thickness t of mounting portion 30. For example, thickness t may be in the range of approximately 0.25 inch (0.64 cm) for small craft to approximately 2.0 inches (5.1 cm) or more for large vessels. A preferred thickness t for average vessels is approximately 1.0 inch (2.5 cm). The height of mounting portion 30 will be proportional to thickness t. At 1.0 inch (2.5 cm) thickness, mounting portion 30 would preferably have a height of approximately 6.0 inches (15.2 cm), for example. The length of mounting portion 30 will be sized to fit the length of dock 12 or boat 20 on which it will be used.

Leaf spring portion 40 projects outwardly from front side 34 of mounting portion 30 and downwardly to extend over mounting holes 42 and then back toward front side 34 of mounting portion 30 to terminate in a free end 66. The shape of leaf spring portion 40 defines a compression space 70 located between leaf spring portion 40 and front side 34 of mounting portion 30. Leaf spring portion 40 and free end 66 preferably extend along the length of fender 10 but may extend along only a portion thereof. A slit 68 divides mounting portion 30 and free end 66. By extending over mounting holes 42, leaf spring portion 40 tends to hide mounting fasteners 48, providing an aesthetically pleasing appearance. Leaf spring portion 40 includes multiple access openings 76 that are aligned with mounting holes 42 and sized large enough to admit a tool (not shown), such as a screwdriver or socket wrench, for tightening or loosening mounting fasteners 48, thereby facilitating installation and removal of fender 10 from dock 12.

Fender 10 is formed of a resilient material that is flexible enough to allow leaf spring portion 40 to collapse into compression space 70 upon impact with an impacting object (not shown) or other applied force "F" directed toward dock 12. However, leaf spring portion 40 is rigid enough, due to its wall thickness and the elasticity of the material from which it is made, such that it is not feasible to manually bend leaf spring portion 40 away from mounting portion 30 to expose mounting fastener 48. Consequently, access openings 76 are particularly helpful for facilitating installation when mounting holes 42 are located beneath leaf spring portion 40, as in the preferred embodiment shown. Alternatively, mounting fasteners 48 could be located in an uncovered location, for example, along one or more flanges that could extend beyond leaf spring portion 40 (not shown). The phantom lines in FIG. 4 show leaf spring 40 in a compressed position 40a, with free end 66a tilted outwardly from front side 34. Leaf spring portion 40 is preferably shaped as an elliptic semi-cylinder when in an unloaded condition, but can also be formed in any other shape suitable for collapsing upon application of an impact force, such as semi-cylindrical, semiellipsoid, hemispherical, and trapezoidal, for example.

Leaf spring portion 40 intersects mounting portion 30 at a common joint section 80. Joint section 80 preferably extends along top edge 84, and leaf spring portion 40 extends downwardly therefrom. However, fender 10 could alternatively be oriented so that joint section 80 extends along a bottom or side edge of fender 10, with leaf spring portion 40 extending upwardly or laterally therefrom (not shown). The preferred orientation shown in FIGS. 3 and 4, with joint section 80 located along top edge 84, prevents water and debris from collecting inside compression space

70. To provide substantial spring action joint section 80 preferably has a thickness comparable to the thickness t of mounting portion 30 and the thickness of leaf spring portion 40, but may be substantially thinner or thicker than mounting portion 30 and leaf spring portion 40 depending on the end use of fender 10.

Joint section 80 and leaf spring portion 40 are sized so that upon application of impact force F (including rubbing or docking-related loads), leaf spring portion 40 will collapse into compression space 70, as indicated by collapsed position 40a. At the same time, free end 66 remains free to slide downwardly along front side 34 of mounting portion 30 and wipe against front side 34, as indicated by position 66a. The curved, "P"-shaped configuration of fender 10 allows a substantial amount of energy of impact to be absorbed in flattening of leaf spring portion 40 rather then being transferred directly to dock 12. Concurrently, the ability of free end 66 to slide over front side 34 of mounting portion 30 maintains the spring action of fender 10 even under sustained impact forces or loads F. In this regard, the interface at slit 68 between free end 66 and front side 34 of mounting portion 30 should have a very low coefficient of friction to promote sliding. In addition, leaf spring portion 40 is desirably made of a material that is resistant to permanent deformation.

The amount of energy absorbed will be a function of the thickness of leaf spring portion 40 and compression space 70, which are selected based on an assumed mass and impact velocity. For example, leaf spring portion 40 may have a thickness ranging between approximately 0.25 inch (0.64 cm) for small craft to approximately 2.0 inches (5.1 cm) or more for larger vessels. The thickness of compression space 70 may range between approximately 0.42 inch (1.07 cm) and approximately 3.4 inches (8.6 cm) or more for small and large craft, respectively. A preferred thickness of leaf spring portion 40 is 1.0 inch (2.5 cm) and a preferred thickness of compression space 70 is 1.7 inches (4.3 cm) for average size vessels.

Fender 10 is preferably extruded of a durable plastic material having a low coefficient of sliding friction, high abrasion resistance, and high strength characteristics, particularly modulus of elasticity (Young's modulus), tensile yield strength, and impact strength, such as a crystalline polyolefin resin. A suitable material is ultra high molecular weight polyethylene (UHMWPE), for example of the type sold under the trade name GUR™ by Ticona LLC of Summit, N.J., USA, a division of Celanese AG and specified by ASTM D4020. While other materials and fabrication techniques can also be used in the manufacture of fender 10, UHMWPE has a combination of physical properties including abrasion resistance, strength, low friction, moldability, and resistance to permanent deformation, that are superior to any other material presently known to the inventor. Extrusion is a particularly efficient and inexpensive fabrication technique for the elongate P-shape of fender 10. Co-extrustion of two or more materials can also be used to achieve different mechanical properties at different parts of fender 10.

The combination of the compact P-shaped spring element and resilient plastic material enables leaf spring portion 40 to collapse upon loading with impact force F, thereby absorbing energy that would otherwise be transferred directly to dock 12 or boat 20. Resistance to permanent deformation also provides a spring action that tends to reflect the absorbed energy and hold apart colliding objects, which is especially useful in the context of a docking maneuver. Leaf spring portion 40 is preferably tough enough to withstand substantially complete compression against mounting portion 30 without undergoing any significant permanent deformation. As shown in FIGS. 1 and 4, an elastomeric layer 92 is provided between mounting portion 30 and dock 12 to dissipate and distribute impact loads, rather than concentrate them at a point on dock 12. Similarly, elastomeric material can be interposed between fender 10 and hull 18 of boat 20 (not shown). A preferred elastomer strip 92 is formed of UV stabilized outdoor marine grade rubber having a hardness of approximately 65 durometer. In the event that impact forces F are great enough to cause substantially complete compression of leaf spring portion 40 and maximum elastic deformation of elastomer strip 92, fender 10 will continue to absorb impact energy by permanently deforming at the location of impact, thereby preventing damage to dock 12 or boat 20.

The invention is also characterized by a low coefficient of kinetic friction, which allows fender 10 to easily slide against another object. For example, boat 20 can easily slide against a piling (not shown) and boat hull 18 can easily slide against fender 10 of dock 12. Preferably the plastic material of fender 10 has a coefficient of kinetic friction against dry polished steel of less than about 0.3. However, coefficients of kinetic friction (against dry polished steel) which are as low as possible or as high as 0.5 would also be within the scope of the present invention. Plastic materials that are useful with the present invention will typically have a coefficient of sliding friction against dry polished steel of greater than 0.05 and less than 0.5. Those skilled in the art will understand that friction characteristics are highly dependent upon the surface condition and the combination of materials that are being rubbed together. Accordingly, friction properties of fender 10 are quantified above in the context of dry polished steel for convenience only and without limiting the scope of the invention. Fender 10 may have a different coefficient of friction when sliding against materials other than dry polished steel. For example, the plastic material of fender 10 should also have a low coefficient of kinetic friction against itself (when dry) to facilitate the sliding motion of free end 66 against front side 34 of mounting portion, and preferably approximately 0.2±0.05. The low friction characteristic of fender 10 also allows the zone of compression of leaf spring portion 40 to travel easily along the length of fender 10 in the manner of a compression wave, further absorbing energy as boat 20 slides against a steel, wooden, concrete, or rubber-faced dock or piling.

As mentioned previously, UHMWPE is the preferred material for use in fender 10. Other materials with some or all of the material properties of UHMWPE would also be desirable. Some physical properties of UHMWPE are set forth in the paper titled "Ultra High Molecular Weight Polyethylene (UHMWPE)", by Harvey L. Stein published by ASM International in Volume 2 of the Engineered Materials Handbook (1999), which paper is incorporated herein by reference. For example, UHMWPE has a modulus of elasticity (Young's modulus) at room temperature of between approximately 0.6 GPa and approximately 0.8 GPa (ASTM D638 and D6712, incorporated herein by reference). UHMWPE has a tensile yield strength ranging between approximately 21.0 MPa and approximately 22.3 MPa and ultimate tensile strength ranging between approximately 46.8 MPa and 53.7 MPa. UHMWPE also has an Izod impact strength of between approximately 70 kJ/m$^2$ and approximately 220 kJ/m$^2$ (modified ASTM D256, double 15° V-notched; and ASTM D6712, incorporated herein by reference), depending on the material composition and the fabrication method used. See, e.g., "Analysis of Contemporary Resins and Conversion Methods", ASTM Working Group for Medical Grade UHMWPE, Oct. 15, 2001, which is incorporated herein by reference. UHMWPE is also highly abrasion resistant, hydrophobic, and chemically resistant. It accepts additives, such as UV stabilizers and fire retardants, which are useful in the present invention. Pigments can also be mixed with UHMWPE to eliminate the need to paint fender 10, allowing matching of the fender's color to a boat 20 or dock 12 or for high-contrast colors and long-lasting visibility. UHMWPE can also be machined using conventional woodworking equipment, for example, to drill mounting holes 42 and access holes 76 after extrusion of mounting portion 30 and leaf spring portion 40. A miter joint 96 (FIG. 1) is another example of a shape easily obtained by conventional woodworking equipment.

Figure 5:
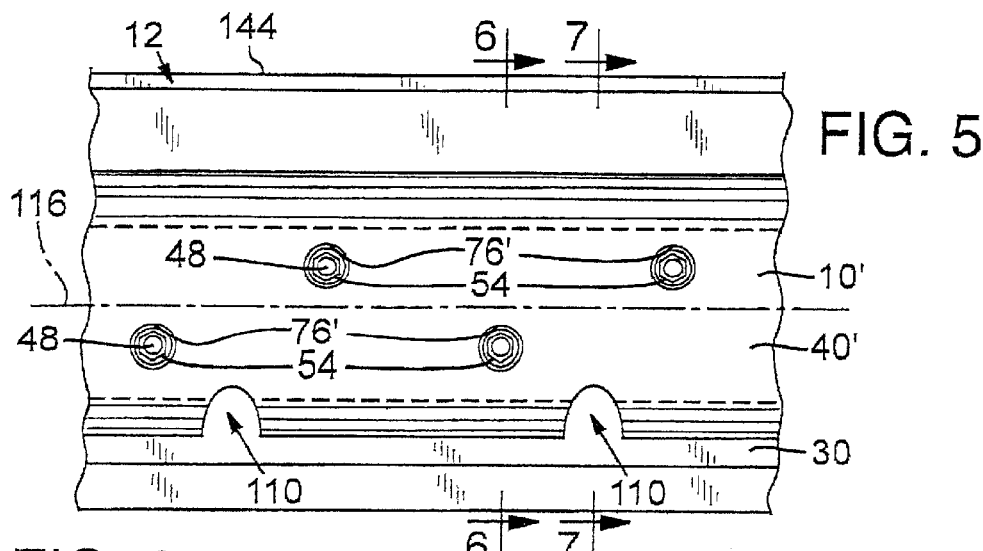
FIG. 5 is a front elevation view of a fender in accordance with a second embodiment of the invention, mounted to the side of a dock.
Figure 6:
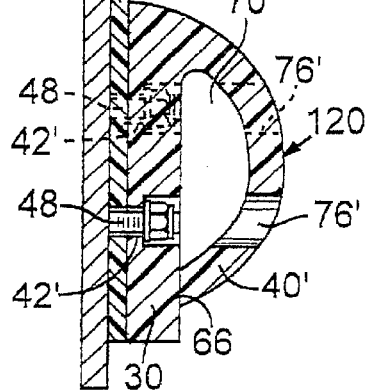
FIG. 6 is a cross section view of the fender of FIG. 5, taken along line 6—6 of FIG. 5.
Figure 7:
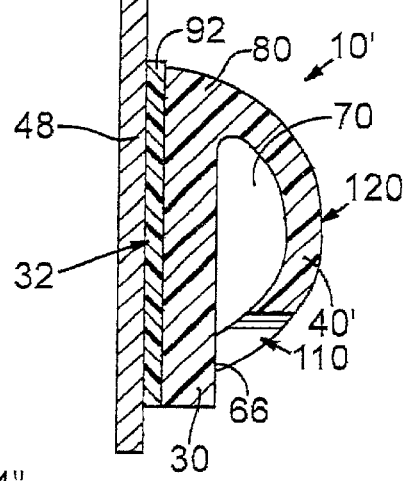
FIG. 7 is a cross section view of the fender of FIG. 5, taken along line 7—7 of FIG. 5.

FIG. 5 shows a front elevation view of a fender 10' in accordance with a second preferred embodiment of the invention. FIGS. 6 and 7 are cross section views taken along respective lines 6—6 and 7—7 of FIG. 5. With reference to FIGS. 5–7, fender 10' includes a plurality of drainage openings 110 formed along free edge 66 of leaf spring portion 40'. Drainage openings 110 facilitate drainage of water from compression space 70 and further facilitate flushing or manual removal of debris that may become trapped in compression space 70.

Fender 10' also includes multiple mounting holes 42', which are staggered on either side of a longitudinal centerline 116 of leaf spring portion 40'. Mounting holes 42' and, consequently, access openings 76' are staggered so that an apex 120 of leaf spring portion 40' is smooth and uninterrupted by access openings 76' along the entire length of fender 10', thereby further reducing frictional forces during sliding or rubbing of fender 10' against another object, such as a piling. Staggering of mounting holes 42 also increases the strength and stiffness of leaf spring portion 40' along its apex 120, as compared to fender 10 of FIG. 3.

Figure 8:
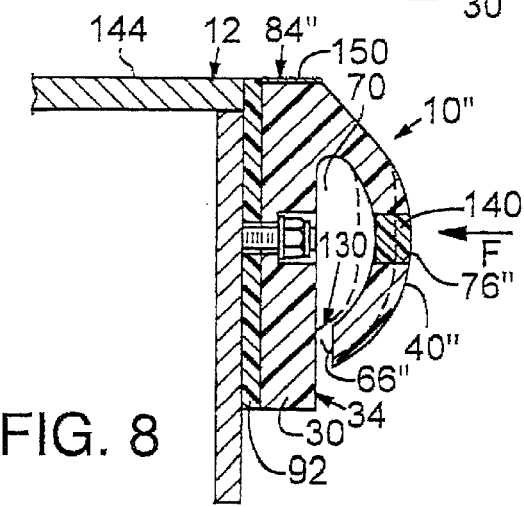
FIG. 8 is a cross section view of an third embodiment fender in accordance with the invention.

FIG. 8 is a cross section view of a fender 10" in accordance with a third preferred embodiment. With reference to FIG. 8, free end 66" of leaf spring portion 40" is normally spaced apart from front side 34 of mounting portion 30, when leaf spring portion 40" is in an unloaded condition. This configuration leaves a gap 130 between free end 66" and mounting portion 30 that causes leaf spring portion 40" to act as a cantilever beam when impact forces F are initially applied to fender 10". The cantilever beam effect can be designed to reduce the opposing reaction forces exerted against the impacting object before gap 130 is closed, thereby causing a more gradual deceleration of smaller impacting objects (not shown) relative to dock 12. Fender 10" is, thus, capable of being flexible enough to prevent damage to smaller vessels colliding with dock 12 and, upon closing of gap 130, becoming stiff enough to also decelerate larger vessels that collide with dock 12. Gap 130 also improves drainage from compression space 70.

FIG. 8 also depicts an optional removable plug 140 positioned in access opening 76" to seal access opening 76" and improve the appearance of fender 10". Fender 10" is shown in FIG. 8 mounted flush with a top side 144 of dock 12 (or boat 20), thereby increasing the effective useable area of the top side 144. To prevent persons (and vehicles) from slipping off the top side 144, a traction enhancing material 150 is embedded in a flat upper surface 84" of fender 10'.

It will be obvious to those having skill in the art that many changes may be made to the details of the above-described embodiments of this invention without departing from the underlying principles thereof. The scope of the present invention should, therefore, be determined only by the following claims.

What is claimed is:

1. A unitary fender for protecting an object from being damaged by impact or rubbing loads caused by contact with another object, comprising:

a mounting portion for mounting to the object, the mounting portion having a rear side for facing the object and a front side opposite the rear side; and a resilient leaf spring portion integrally formed of one-piece construction with the mounting portion, the leaf spring portion projecting outwardly from the front side of the mounting portion to extend over at least part of the front side and then back toward the front side to terminate in a free end, the leaf spring portion defining a compression space located between the leaf spring portion and the mounting portion into which the leaf spring portion collapses when under load to thereby absorb a substantial amount of energy, the free end of the leaf spring portion being free to slide along the front side of the mounting portion when the leaf spring portion collapses under load, the leaf spring portion and the mounting portion being formed of ultra high molecular weight polyethylene.

2. The fender of claim 1 in which leaf spring portion is curved and the free end abuts the front side when the fender is in an unloaded condition to thereby form a P-shaped cross section.

3. The fender of claim 1 in which the fender is formed by an extrusion process.

4. The fender of claim 1 in which:

the mounting portion is shaped as a strip having a longitudinal axis;

the leaf spring portion meets the mounting portion at a common joint section that extends parallel to the longitudinal axis; and the leaf spring portion projects from the common joint section in a direction transverse of the longitudinal axis.

5. The fender of claim 1 in which:

the mounting portion includes multiple mounting holes positioned under the leaf spring portion for receiving fasteners for mounting the fender to the object; and the leaf spring portion includes multiple access openings aligned with the mounting holes, the access openings each being sized to admit a tool for tightening the fasteners, to thereby facilitate attachment of the fender to the object.

6. The fender of claim 5, further comprising a plurality of removable plugs positioned in the access openings.

7. A unitary fender for protecting an object from being damaged by impact or rubbing loads caused by contact with another object, comprising:

a mounting portion for mounting to the object, the mounting portion having a rear side for facing the object and a front side opposite the rear side; and a resilient leaf spring portion integrally formed of one-piece construction with the mounting portion, the leaf spring portion projecting outwardly from the front side of the mounting portion to extend over at least part of the front side and then back toward the front side to terminate in a free end, the leaf spring portion defining a compression space located between the leaf spring portion and the mounting portion into which the leaf spring portion collapses when under load, and the leaf spring portion including one or more drainage openings to allow fluids to drain from the compression space.

8. A fender for protecting an object from being damaged by impact or rubbing loads caused by contact with another object, comprising:

a mounting portion for mounting to the object, the mounting portion having a rear side for facing the object and a front side opposite the rear side;

a resilient leaf spring portion integrally formed of one-piece construction with the mounting portion, the leaf spring portion projecting outwardly from the front side of the mounting portion to extend over at least part of the front side and then back toward the front side to terminate in a free end, the leaf spring portion defining a compression space located between the leaf spring portion and the mounting portion into which the leaf spring portion collapses when under load; and an elastomer layer positioned between the mounting portion and the object.

9. A fender for protecting a deck or dock from being damaged by impact or rubbing loads caused by contact with another object, comprising:

a mounting portion for mounting to the deck or dock, the mounting portion having a rear side for facing the deck or dock and a front side opposite the rear side;

a resilient leaf spring portion integrally formed of one-piece construction with the mounting portion, the leaf spring portion projecting outwardly from the front side of the mounting portion to extend over at least part of the front side and then back toward the front side to terminate in a free end, the leaf spring portion defining a compression space located between the leaf spring portion and the mounting portion into which the leaf spring portion collapses when under load;

a flat upper surface aligned transversely of the mounting portion, the upper surface positioned for mounting flush with the deck or dock; and a traction material embedded in the upper surface.

10. A unitary fender for attachment to an object to protect the object from being damaged by impact or rubbing against another object, comprising:

an elongate mounting portion having a thickness and multiple mounting holes spaced apart along the length of the mounting portion, the mounting holes extending through the thickness of the mounting portion and being sized to receive fasteners for attaching the fender to the object; and a leaf spring portion integrally formed of one-piece construction with the mounting portion and extending along the length of the mounting portion, the leaf spring portion projecting outwardly from the mounting portion in a direction transverse to the length of the mounting portion and over the mounting holes, the leaf spring portion bordering a compression space located between the leaf spring portion and the mounting portion, the leaf spring portion including a plurality of access openings aligned with the mounting holes, the access openings each being sized to admit a tool for tightening the fasteners, to thereby facilitate attachment of the fender to the object.

11. The fender of claim 10 in which the leaf spring portion and the mounting portion have a P-shaped cross section.

12. The fender of claim 10 in which the mounting portion and the leaf spring portion are composed of a substantial amount of a plastic material.

13. The fender of claim 12 in which the plastic material includes ultra high molecular weight polyethylene.

14. The fender of claim 12 in which the plastic material includes a pigment.

15. The fender of claim 10, further comprising a plurality of plugs inserted in the access openings.

16. The fender of claim 10 in which the leaf spring portion includes one or more drainage openings to allow fluids to drain from the compression space.

17. The fender of claim 10, further comprising an elastomer layer positioned between the mounting portion and the object.

18. The fender of claim 10, further comprising an upper flat surface having a slip-resistant texture for mounting flush with a deck or a dock.

19. The fender of claim 10, in which the leaf spring portion has a longitudinal centerline extending along the length of the mounting portion and in which the mounting holes and the access holes are staggered alongside the longitudinal centerline.

* * * * *